C. J. OHLSSON.
HOOK.
APPLICATION FILED DEC. 22, 1910.

1,093,945.

Patented Apr. 21, 1914.

WITNESSES:
Edwin H Dieterich.
Nellie M. Chase

INVENTOR
CHARLES J. OHLSSON
BY
Conrad A. Dieterich
ATTORNEY

UNITED STATES PATENT OFFICE.

CHARLES J. OHLSSON, OF NEW YORK, N. Y.

HOOK.

1,093,945.  Specification of Letters Patent.  Patented Apr. 21, 1914.

Application filed December 22, 1910. Serial No. 598,774.

*To all whom it may concern:*

Be it known that I, CHARLES J. OHLSSON, of the city of New York, borough of Brooklyn, Kings county, in the State of New York, have invented certain new and useful Improvements in Hooks, of which the following is a full, clear, and exact specification.

My invention relates to improvements in securing means, and the same has for its object more particularly to provide a hook formed of a single piece of wire adapted for use upon anti-skid chains for vehicle wheels, which hook shall be strong, durable and not liable to become distorted under pressure or strain.

Further, said invention has for its object to provide a hook having locking devices loosely arranged thereon whereby to prevent the free ends of the eye and hook members being drawn away from the shank or body portion of the hook.

Further, said invention has for its object to provide a hook having a plurality of locking members loosely arranged thereon adapted to embrace or confine the free ends of the eye and hook member, and means for maintaining said locking members in position upon the hook to confine the eye and hook members thereof.

To the attainment of the aforesaid objects and ends, my invention consists in the novel details of construction and in the combination, connection and arrangement of parts hereinafter more fully described and then pointed out in the claim.

Figure 1:
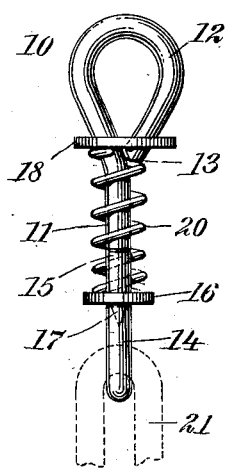
Figure 2:
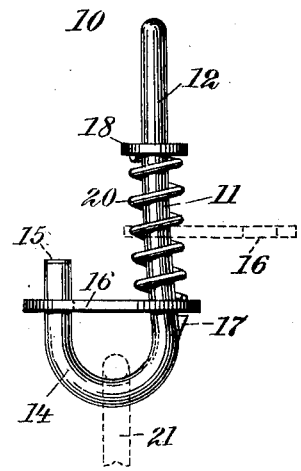
Figure 3:
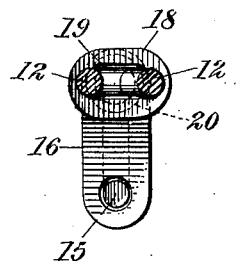

In the accompanying drawings forming part of this specification, wherein like numerals of reference indicate like parts, Figure 1 is a front view showing one form of hook constructed according to and embodying my said invention; Fig. 2 is a side view of the hook showing the locking member in full lines engaging the hook, and, in dotted lines, raised and thrown aside to permit of the hook being engaged with a device, and Fig. 3 is a section taken on the line 3—3 of Fig. 1.

In said drawings the hook 10 is shown formed of a single piece of wire comprising a shank 11 having its upper end formed into an eye 12 having its free end bent and terminating in close proximity to said shank 11. The end of said eye adjacent to the shank 11 is beveled and has its end cut away at 13. The lower end of the shank 11 is bent to form a hook member 14 which has its extremity 15 arranged substantially parallel with the shank 11 of the hook.

16 denotes a flat metal plate provided adjacent to its opposite ends with apertures of slightly larger diameter than the material of which the hook 10 is formed. The shank 11 is passed through the opening in one end of the plate 16 while the extremity 15 of the hook 14 is adapted to be received by the aperture in the opposite end of said plate 16. Upon the rear side of the hook 14 is provided a projection 17 which extends outwardly from the hook member 14 and forms a stop against which the under-side of the plate 16 is adapted to contact in order to prevent the inner portion of said plate 16 passing down upon the hook member 14.

18 denotes a plate similar to the plate 16, except that it is shorter in length, and provided with a longitudinal slot 19. The said plate 18 is disposed upon the shank 11 and is adapted to engage and confine the lower free end of the eye 12.

20 denotes a coil spring arranged upon the shank 11 having its upper end bearing against the under side of the plate 18, and its lower end bearing against the upper side of the lower plate 16, and serving to hold the upper plate 18 in position upon the hook to confine the free end of the eye 12, and at the same time maintaining the lower plate 16 normally against the stop 17 extending from the rear side of said hook 14.

In order to engage the hook with the link 21 of a chain, or other device, it merely becomes necessary to force the plate 16 upwardly against the tension of the spring 20 until the outer end of the plate 16 is raised to a point above the extremity 15 of the hook member 14, whereupon said plate 16 may be rotated upon the shank 11 of the hook and caused to assume the position as indicated in dotted lines at Fig. 2. As soon as the hook is engaged with a link, or other device, it merely becomes necessary to partially rotate the plate 16 and bring the aperture in the outer end thereof in register with the extremity 15 of the hook member 14, whereupon the spring 20 will cause the said plate to be forced downwardly upon the shank 11 until its under side contacts with the projection 17 and arrests further downward movement thereof.

It will be noted that in my improved hook construction, the means for confining the free ends of the eye 12 and the hook member 14 may be readily passed over the lower or free end of the eye 12 before the same is forced inwardly against the upper end of the shank 11, and that the same will then be maintained in position upon the hook to hold the free ends of the eye and hook members against any spreading by the action of the spring 20, which serves to hold the parts duly in position upon the hook. It will be noted further that by means of my improved construction, I am enabled to make a hook of comparatively light stock which will be rendered sufficiently strong for any purposes for which the same may be used, by reason of the fact that the portions of the hook which are liable to bend or become distorted, are maintained against such action by the retaining means in the form of the plates 16 and 18 acting in conjunction with the spring 20.

Having thus described my invention what I claim and desire to secure by Letters Patent, is:

A hook composed of a single piece of wire having an eye member formed at one end thereof, and a hook member formed at its other end, a pair of movable flat locking plates carried by and loosely arranged upon said hook intermediate said eye and hook member, one of said plates being provided with a longitudinal slot adapted to receive the upper end of said shank and the free end of said eye and the other of said plates provided with a circular opening adjacent to each of its ends one opening adapted to receive the shank of said hook and the other opening adapted to embrace the extremity of the hook member, a coil spring disposed upon the shank of said hook intermediate of and adapted to contact with said locking plates to simultaneously maintain the plates in their respective position upon said hook, and an integral stop arranged upon the outer side of said hook member adapted to limit the downward movement of said last named plate upon said hook, substantially as specified.

Signed at the city of New York, in the county and State of New York, this twentieth day of December, one thousand nine hundred and ten.

CHARLES J. OHLSSON.

Witnesses:
 CONRAD A. DIETERICH,
 JOSEPH G. QUINN, Jr.

---

Copies of this patent may be obtained for five cents each, by addressing the "Commissioner of Patents, Washington, D. C."